Dec. 16, 1930.                S. M. DAY                1,785,694
                          COLOR LIGHT SIGNAL
                         Filed Nov. 6, 1922
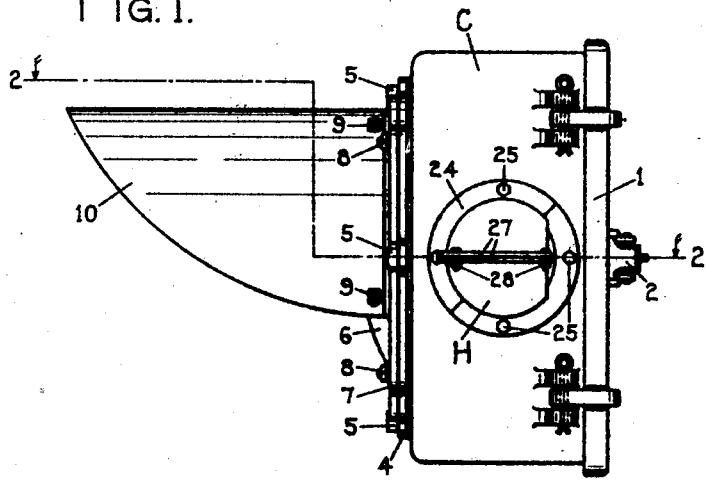
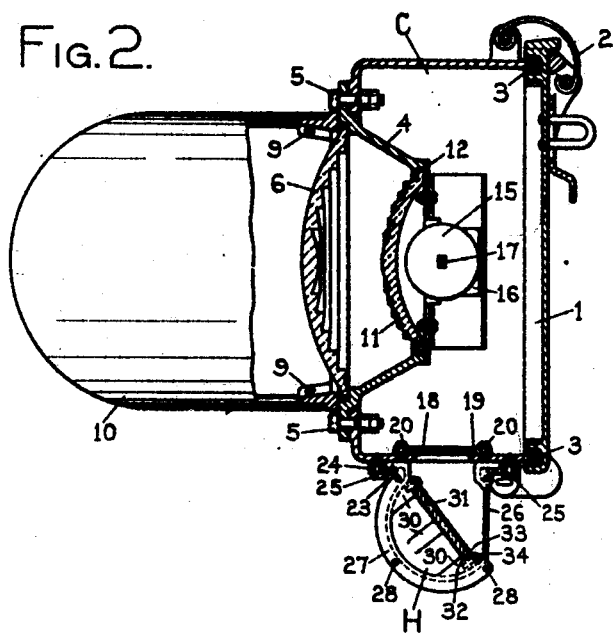

Patented Dec. 16, 1930

1,785,694

UNITED STATES PATENT OFFICE

SALISBURY M. DAY, OF ROCHESTER, NEW YORK, ASSIGNOR TO GENERAL RAILWAY SIGNAL COMPANY, OF GATES, NEW YORK, A CORPORATION OF NEW YORK

COLOR-LIGHT SIGNAL

Application filed November 6, 1922. Serial No. 599,361.

This invention relates to color light signals for railway signaling purposes, and more particularly to the provision of an auxiliary or secondary indication for such light signals so that the signal indication may be determined from different points of view.

In one typical form of color light signal used in railway signaling systems, there are a number of light projecting units, having different colored lenses or color screens, such as green, yellow, and red, and upon lighting the lamps of these respective units or selecting the effective color screen, the desired distinctive colored indication may be given. Since the indication of such a light signal is primarily used for the guidance of the engineer of a train approaching the light signal, the signal is ordinarily designed so that this indication is visible only through a relatively small angle of spread from directly in front of the signal.

Under certain operating conditions on railroads, however, it is found desirable to be able to determine the indication of a color light signal from some point of view other than directly in front of the signal. For example, it is the rule or practice on some railroads to require the engineer or train crew to look back at each signal as it is passed and see if the signal has properly changed to give its danger indication. Such procedure is possible with the semaphore signal, the position of which can be ascertained from a point in the rear as well as in the front; but with the ordinary color light signal, it is impossible to determine the indication of the signal from the back or the rear. Also, in connection with the well-known absolute-permissive-block type of automatic block signal system for single track railroads, it is of great assistance to trackmen, maintainers and inspectors running over a track, and other persons along the track, to be able to tell the indication of a signal from the back, since the approach of a train in one direction is shown by the change to the stop indication of the opposing signals governing train movement in the opposite direction. Again, it is important that the indication of a color light signal should be visible from in front of the signal while standing very near or even directly under the signal, so that the engineer may bring his train directly up to the signal and still be able to see any change in indication; and while such visibility at close range can be obtained by special provision for the distortion or spread of the main beam of light downward near the signal, it is difficult to do so without an additional consumption of energy, and further, it is found desirable to provide a signal with a short range auxiliary indication for reasons which will appear hereinafter.

With these and other considerations in mind, the purpose of the present invention is to provide a special auxiliary or secondary indication or aspect for color light signals enabling the indication of the signal to be determined from a point of view in the rear, close to the signal, or at some other desired point. One important object is to provide such auxiliary indication in a manner which will not interfere with the proper operation of the main signal, that is, will not be likely to cause a false phantom signal. More specifically, it is proposed to transmit the light for such auxiliary indication from the side of the signal casing, and then reflect the light in the desired direction, this being preferable because light entering from two directions at right angles to each other in a signal casing is not apt to produce a phantom, especially if the internal walls of the signal casing are darkened.

Other characteristic features and advantages of the invention will appear as the description thereof progresses.

In describing the invention in detail, reference will be made to the accompanying drawings, in which:—

Figure 1 illustrates a side elevation of a light signal provided with means for giving an auxiliary indication embodying the present invention; and Fig. 2 is a sectional view taken on the line 2—2 of Fig. 1, as viewed in the direction of the arrows.

Although light signals are usually used in groups of two or three, in order to give a plurality of indications, these units being provided with different colored lenses, in describing the present invention it is deemed necessary to illustrate and describe only one of these units.

Referring to the drawings, the invention has been shown in connection with a color light signal unit of one specific construction; but it should be understood that the invention is applicable to other specific types of signals. This light signal unit comprises, in general, a box-like casing C which is preferably made of cast iron so as to have the necessary strength and rigidity, and having its internal walls darkened for reasons appearing hereinafter. This casing C is formed with a large circular opening in its front wall, and is provided with an open back closed by a movable door 1. This door 1 may be connected to the casing C in any suitable manner, but in the construction shown the door is formed with integral lugs at one side which are hinged on cotter pins or the like supported by pairs of lugs integral with one side wall of the casing C, so that the door may be swung back and expose the entire inside of the casing. The door 1 is also preferably provided with a suitable spring hasp fastener 2 for pressing the door inward, so that the gasket 3 in the groove around the door will seat tightly against the edges of the casing C.

A light projecting unit, comprising a lamp and its socket, the inner and outer lenses of the doublet combination, and a suitable hood, is detachably fastened to the front wall of the casing C. This light projecting unit also comprises a tubular tapered casting 4, conveniently called a lens barrel, which preferably has its internal and external walls darkened, and is formed with an outer flange fastened by bolts 5 to the front wall of the casing C. The outer lens 6 of the doublet combination bears around its edges directly against the bottom of a groove or rabbet formed in the larger end of the lens barrel 4. This outer lens 6 is held in place by a retaining member 7, which is fastened to the lens barrel 4 by screw bolts 8, a gasket of felt or the like being preferably interposed between this retaining member 7 and the edges of the lens 6. Extending part way around the upper part of the retaining member 7, and integral therewith, is a forwardly projecting flange to which is fastened by screw bolts 9 a curved sheet metal hood or shield 10.

The inner lens 11 of the doublet combination also seats at its edge in a groove or rabbet in the smaller end of the lens barrel 4, and this lens is held in place by a retaining member or bezel ring 12 fastened to the lens barrel in any suitable manner, and having a similar gasket which is preferably provided between the lens barrel 4 and this lens. The inner and outer lenses 11 and 6 are of the well-known Fresnel or step type, the steps or corrugations being formed on the inner surface of the outer lens, and on the outer surface of the inner lens. The outer lens is clear or colorless, while the inner lens is made of glass having the desired shade of red, green, yellow or the like for the appropriate signal indications.

The purpose of this combination or arrangements of lenses is to utilize as much of the total light rays or flux emitted by the filament as it is practicable to obtain without the use of reflectors, and its objectionable tendency to produce phantom indications. In this arrangement of lenses, which may be conveniently termed a "doublet combination", the incandescent lamp constituting a source of light is located with its filament as close to the inner lens 11 as permitted by the size of the lamp globe needed to take care of radiation, and also the practical clearance required to allow insertion and removal of the lamp. It will be evident that the closer the filament is to the lens, the greater proportion of the total spherical candle power of the filament will be received by the lens; and in the specific construction shown, it can be seen that the cone of light rays falling upon the inner lenses embraces a solid angle corresponding to a little less than 180 degrees, the lamp being spaced back far enough to allow sidewise radiation of light for the auxiliary aspect or indication to be described hereinafter.

The inner lens 11 is made with its inner surface concave and with prismatic zones of spherical curvatures on its outer surface. These zones are designed in accordance with established optical principles so as to converge the light rays emanating from the filament upon the outer larger lens 6. The inner lens has an apparent focus at a point behind the lamp, preferably at the apex of the angle embraced by the outer edges of the two lenses. The outer lens 6 has its outer convex surface smooth, and is formed with zones on its inner surface of the proper curvature to project an image of light from the focus of the inner lens into a beam of the desired angular spread.

An incandescent lamp 15 is supported from the lens barrel 4 in any suitable manner as, for instance, by a lamp receptacle having a base 16 in a manner so that the two filaments 17 of this lamp are located substantially in the focus of the lens combination, for reasons heretofore pointed out. These filaments 17 are connected in multiple, and preferably have a slightly different resistance so that one of these filaments will be heated to a higher temperature than the other, and will therefore have a corresponding shorter life, whereby the other filament will serve as a reserve source of light when the first mentioned filament burns out.

In the side of the casing C is provided a small opening through which the light for the auxiliary aspect signal may pass. This opening is provided with a color screen 18, having a color the same as the lens 11 or a color corresponding thereto, so that the engineer or other person may recognize which signal is being given, that is, the color screen 18 and lens 11 may transmit slightly different colored light so that one could not possibly be confused for the other, but having sufficient likeness so that their significance may be easily remembered. This color screen 18 is held in place by a bezel ring 19 fastened to the wall by screws 20. Adjustably supported over this small opening is a substantially spherically shaped hood H, which terminates in a cylindrical neck having a circular flange 23. This hood H is supported against the casing by a flanged ring 24 screw fastened to the casing by cap screws 25, whereby the hood may be clamped against the wall of the casing in any desired relation, that is, the hood may be turned so that the opening 26 formed therein is located on the desired side. This hood is preferably formed in two halves each provided with a flange 27, these flanges being bolted together by bolts 28.

Each half of the hood H is preferably provided with shoulders 30 against which a circular mirror 31 is adapted to rest, a gasket 32 being preferably provided back of this mirror to protect the same. This mirror 31 may be put in place before the two halves of the hood H are assembled, and is held in place by a bezel ring 33 screw fastened to the two halves of the hood H by screws 34, whereby this bezel ring 33 serves to hold the mirror 31 in place, and also aids in holding the two halves of the hood H together into a unitary structure. The mirror 31 may be flat, convex or concave, as desired, to spread or concentrate the light and give the desired range and spread to the auxiliary beam of light.

The beam of colored light constituting the auxiliary indication may be directed forwardly, downwardly or rearwardly at any angle by loosening the screws 25 of the ring 24 and turning the hood H to direct the light reflected from the mirror 31 in the desired direction. As previously explained, it is sometimes desired to be able to tell the indication of a light signal from the back, usual at a relatively close range; and this result can be easily obtained with this invention by adjusting the hood H accordingly. Similarly, if it is desired to use this auxiliary signal formed by the hood H and its associated parts as the signal indication similar to the main signal but directed so that the engineer may observe it when very closely up to the signal, this hood will be turned so that the opening 26 faces toward the front of the signal and downward in the desired direction.

It will be noted that the entrance of light through either the large or small opening of the signal casing C will not, at any adjustment of the hood H, be apt to produce a phantom indication, because the internal walls of the casing are darkened and the light entering one opening can not strike the other opening except by reflection from the walls of the casing. This is very desirable because it assures that an indication given by the signal embodying the present invention will be due to the illumination of the lamp contained therein, and not to light emitted through one opening and directed through the other opening as might be possible if these openings were located in opposite walls, or if the internal walls of the casing were such that reflection rather than absorption of light would take place.

A double aspect light signal has thus been provided which permits the main signal or aspect to be first adjusted to transmit the signal in the desired direction, after which the auxiliary aspect signal may be adjusted to direct its light in the desired but different direction, this latter adjustment facilitating the directing of light either toward the front, the bottom or toward the back of the signal, and in which suitable light concentrating and projecting devices are used which employ refraction rather than reflection so as to avoid undesirable phantom indication.

The particular construction of the light signal shown and described is susceptible of considerable modification and adaptation in practice, and it should be understood that the present invention is not limited to the specific embodiment herein disclosed.

What is desired to be secured by Letters Patent of the United States, is:—

1. A light signal for railway signaling purposes comprising, a substantially rectangular casing having a relatively large opening in the front wall and a relatively small opening in the side wall, a light producing and projecting unit located in the large opening in said casing, a nontransparent barrier portion forming part of the projecting unit and located between said openings and preventing the passage of light through the casing from either one of said openings to the other, and means for reflecting light located over the small opening, whereby light can be directed through said openings from the single light source of said unit located in said casing but can not be directed in through one of said openings and out through the other to produce phantom indications.

2. A double aspect light signal for railway signaling purposes comprising, a casing provided with a relatively large opening in the front wall and a relatively small opening in the side wall, a light producing and projecting unit in the casing in said large opening with its light source at the intersection of the axes of the openings in said casing, a non-transparent barrier portion forming part of said unit and located between said openings for preventing the direct passage of light through said casing from either one of said openings to the other, and a hood including a light reflecting means and having an open side disposed over said small opening.

3. In a light signal, a casing, a relatively large and a relatively small opening in said casing have their axes substantially at right angles, a light source at the intersection of the axes of said two openings, a non-transparent barrier in the casing extending between the two openings and terminating short of where it would prevent direct passage of light from said source to said openings, and an open sided hood including light reflecting means positioned over said small opening to constitute a short range indication.

4. In a light signal, a casing, a relatively large and a relatively small opening in said casing have their axes substantially at right angles, a light source at the intersection of the axes of said two openings, a non-transparent barrier in the casing extending between the two openings and terminating short of where it would prevent direct passage of light from said source to said openings, an open sided hood, light reflecting means in said hood, and means adjustably positioning the hood over said small opening to permit adjustment of the hood to variously direct the opening of said hood.

5. In a light signal, a casing, a relatively large and a relatively small opening in the casing have their axes substantially at right angles, a light source at the intersection of the axes of said two openings, a non-transparent barrier in the casing extending between the two openings and terminating short of where it would prevent direct passage of light from said source to said openings, a ring adjustably fastened to the casing around said small opening, an open sided hood carried by the ring, and a light reflecting means in the hood for directing light from said light source out through the open side of said hood.

6. A double aspect light signal for railway signaling purposes comprising, a casing having walls with non-reflecting inner surfaces, said casing being provided with a relatively large opening in the front wall and a relatively small opening in the side wall, a light producing and projecting unit in the casing in said large opening with its light source at the intersection of the axes of the openings in said casing, and a non-transparent barrier portion forming part of said unit and located between said openings for preventing the direct passage of light through said casing from either one of said openings to the other.

In testimony whereof I hereby affix my signature.

SALISBURY M. DAY.